United States Patent Office 2,890,931
Patented June 16, 1959

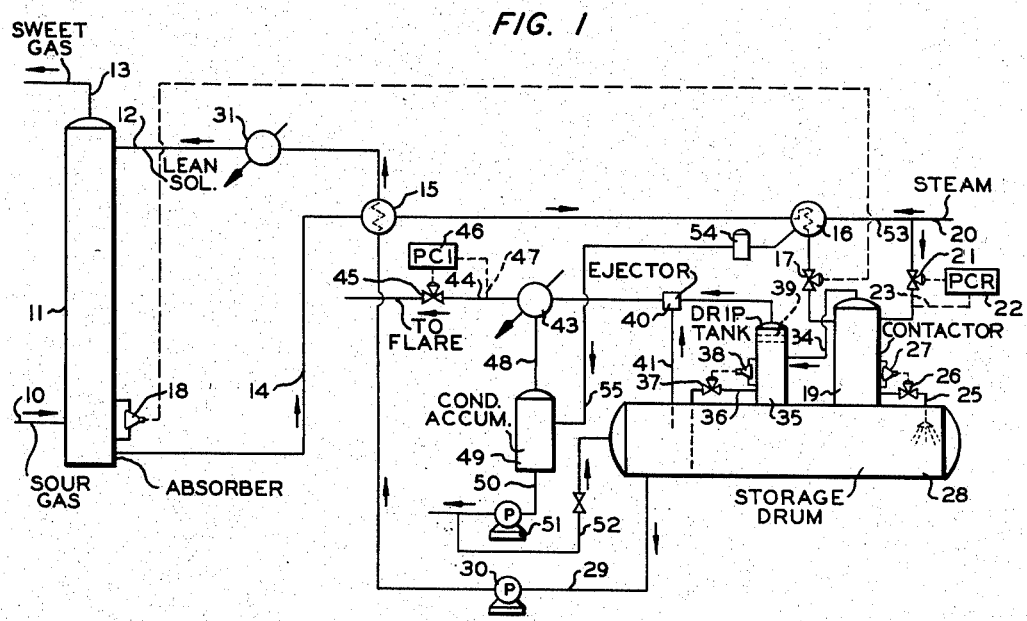

2,890,931

METHOD OF TREATING ABSORBER SOLUTIONS USED IN GAS PURIFICATION

Elmer J. McCreary, Bartlesville, Okla., assignor to Phillips Petroleum Company, a corporation of Delaware Application November 18, 1955, Serial No. 547,656

8 Claims. (Cl. 23—3)

This invention relates to a method of treating absorber solutions used in gas purification.

In the purification of gases, particularly, natural gas, wherein acidic compounds such as hydrogen sulfide and carbon dioxide are removed, difficulties are encountered in reactivating the absorber solution. In particular, where natural gas is treated with a monoethanolamine solution, it is rather difficult to reactivate the solution by ordinary fractionation. Proper control of the temperature of the monoethanolamine solution during reactivation is also quite important in that at temperatures above about 300° F., a slow decomposition of the solution takes place with the formation of extremely corrosive decomposition products.

In accordance with one important aspect of the invention, a rich monoethanolamine treating solution is heated by indirect heat exchange to a temperature of about 245° F. and then contacted with live steam while maintaining a temperature in the neighborhood of 275° F. and preventing temperature rise to 290 or 300° F.

In another important aspect of the invention, contacting between steam and an absorbent solution is effected within a special type of treating vessel. In this vessel, the rich treating solution is sprayed into contact with steam previously used to remove the acidic compounds from relatively purified amine solution. This spray contacting effectively removes the major part of the acidic compounds which are discharged to a flare. Thereupon the partially purified treating solution contacts pure steam and passes concurrently therewith through a suitable contacting device, such as a series of perforated trays. This results in very effective removal of the acidic compounds from the treating solution without formation of corrosive decomposition products.

In still another aspect of the invention, the gaseous effluent from the contacting zone is passed through an ejector to provide a reduced pressure in a storage vessel for the purified amine solution, and the water contained in this stream is efficiently recovered as a demineralized water product.

Accordingly, it is an object of the invention to provide an improved method of purifying absorber materials used in the purification of gas.

It is a further object to provide efficient contact between the rich absorber material and steam while preventing the temperature from reaching a value which would result in the formation of undesirable corrosive decomposition products.

It is a still further object to economically recover the water and energy content of the gaseous effluent from the purification step.

It is a further objct to provide an efficient, low cost system for purifying natural gas.

Various other objects, advantages and features of the invention will become apparent from the following detailed description taken in conjunction with the accompanying drawing, in which:

Figure 1 is a flow diagram of a gas recovery system constructed in accordance with the invention;

Figure 2 is a vertical, sectional view, partly in elevation, of the contacting device;

Figure 3:
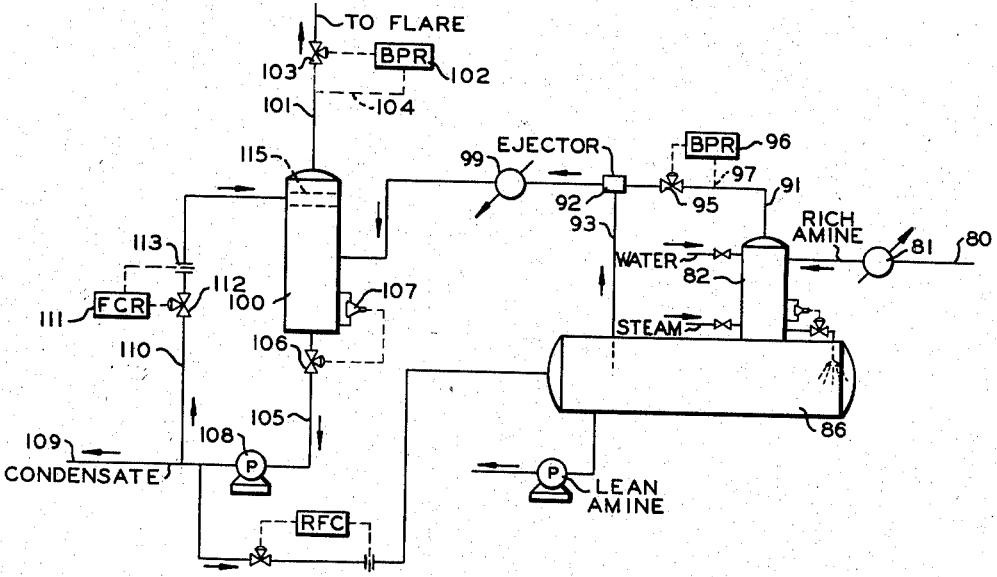
Figure 3 is a flow diagram of a modified purification system.

Referring now to Figure 1, the gas to be purified is fed through a line 10 to an absorber column 11 wherein it is contacted with an absorber solution, such as monoethanolamine, diethanolamine, triethanolamine, mixtures of these amines or other aqueous alkaline solutions, which is introduced through a line 12. The purified gas, substantially free of acidic compounds, is withdrawn overhead by a line 13, and the rich absorber material, containing acidic compounds, such as hydrogen sulfide, carbon dioxide and mercaptans, is withdrawn by a line 14.

The rich solution passes successively through heat exchangers 15 and 16 which heat it, by increments, to a temperature within the range of 240 to 265° F. A motor valve 17 operatively connected to a liquid level controller 18 feeds the rich solution to a contacting vessel 19 at a rate controlled to maintain a predetermined liquid level in the absorber column 11.

Within the vessel 19, the rich solution is contacted with steam which is admitted to the contacting vessel from a line 20 under the control of a motor valve 21 operatively connected to a pressure recorder controller 22 having a sensing element 23 in the line 20. The controller 22 maintains a predtermined pressure of about 45 p.s.i.a. in the bottom and 43 p.s.i.a. and 271° F. in top of the contacting vessel, and the steam addition is carefully controlled to maintain a temperature of 260 to 290° F. within the contacting vessel.

In the vessel 19, as will be more fully described hereinafter, the absorber solution is purified and freed of acidic compounds, the purified liquid being withdrawn through a line 25 under the control of a motor valve 26 which is operatively connected to a liquid level controller 27. This controller regulates the flow of purified solution into a storage drum 28 at such a rate as to maintain a predetermined liquid level within the contacting vessel 19.

A purified solution is withdrawn, as required, from the drum 28 and passes through a line 29, a pump 30, the heat exchanger 15 and a cooler 31 to the absorber solution inlet 12 of the column 11.

A gaseous stream, containing steam and the acidic compounds removed from the absorber solution, leaves the vessel 19 through a line 34 and passes to a drip tank 35 wherein some of the steam is condensed and entrained liquid ($H_2O$ plus amine) separates into a liquid phase within the vessel. This liquid, which contains small quantities of treating solution, is withdrawn through a line 36 under the control of a motor valve 37 operatively connected to a liquid level controller 38. This material discharges through a line 36 to the drum 28 at a rate determined by controller 38 to maintain a desired liquid level within the tank 35.

At the top thereof, the tank 35 is provided with wire mesh or other forms of mist extractors 39 to prevent liquid entrainment in the gas leaving the tank, and this material, which is essentially a mixture of steam and the acidic compounds substantially denuded of treating solution, is passed through an ejector 40. The ejector 40 has a pressure reduction line 41 extending into the drum 28 so that the pressure of the gas is utilized to provide a desired reduced pressure within the storage drum 28.

From the ejector 40 the gaseous material passes to a condenser 43 wherein substantially all of the water vapor is condensed, the acidic sulfur gases passing through a line 44 under the control of a motor valve 45 operatively connected to a pressure indicator controller 46 having a sensing element 47 in the line 44. Thereupon, the gases are discharged to a flare or other suitable disposal, as desired, and the controller 46 maintains a predetermined back pressure on the system.

The condensate from unit 43 passes through a line 48 to an accumulator 49 from which a demineralized water product is withdrawn through a line 50 and passed through a pump 51 either to a steam generator or, as required, through a valved line 52 to the storage drum 28.

Steam is passed to the heat exchanger 16 by a line 53 which, in turn, is connected by a steam trap 54 and a line 55 to the accumulator 49. This connection insures the presence of steam in the exchanger 16, and permits recovery of the condensate as a demineralized water product.

In the foregoing description it will be noted that the rich absorber solution is effectively purified by virtue of the efficient contact between the steam and rich absorber solution. Moreover, the energy, water content, and treating solution of the effluent from the contacting vessel are all very efficiently recovered. Finally, the temperature is controlled to obtain most efficient purification of the absorber solution without the formation of corrosive decomposition products or dilution of the treating solution.

The contactor 19 of Figure 1 is shown in more detail by Figure 2. It will be noted that the rich absorbent solution enters the vessel near the top through a generally horizontal pipe 58 having a series of upwardly-directed perforations 59 interiorly of the vessel. This spray is contacted with steam within a chamber 60 defined by plates 61, 62 and 63, the steam having previously contacted a relatively purified absorber solution. Due to the maintenance of a temperature of 260 to 290° F. within the vessel, the acidic compounds are efficiently stripped from the absorbent solution and passed as a gas through an outlet pipe 65 at the top of the vessel.

The partially purified absorber liquid passes through a downcomer 66 and a liquid trap 67 to a chamber 68 where it is contacted with live steam introduced through a conduit 70. The steam and partially purified liquid flow concurrently through two sets 71 and 72 of contacting trays toward the bottom of the vessel. This contact between the steam and solution efficiently removes the remaining acidic compounds from the absorbent material which flows downwardly through a pipe 73 to the bottom part of the vessel. The steam, after contacting the solution in the trays 71 and 72, passes upwardly through passages 74 and 75 to the chamber 60 where it contacts the incoming rich solution, as previously described. Suitable baffles are provided in the vessel to confine the flow of steam in the manner stated, and it will be observed that the steam can flow into the regions 76 and 77 of the vessel to maintain the contacting step at the prescribed temperature.

The contacting action effected within the vessel 19 as thus described, is much more efficient and provides a purer product than would contacting of the materials in an ordinary stripper column.

As a specific example of the application of the process, there can be mentioned the purification of a monoethanolamine solution used to remove acidic gases from sour natural gas. It is to be understood, however, that the invention is not to be restricted to this particular type of treatment but is applicable to other gas absorption agents suitable for removing impurities from gas streams.

In this specific embodiment, 100 gallons per minute of a 15 percent aqueous solution of monoethanolamine containing hydrogen sulfide and other acidic compounds removed from the natural gas passes through line 14 and heat exchangers 15, 16 wherein it is raised to a temperature of 245° F. 45 pounds p.s.i.a. of steam enters the vessel 19 in sufficient quantities to raise the temperature to 274° F. bottom and 272° F. top. The purified monoethanolamine solution is introduced into the drum 28 and fed through line 29 at a rate of 100 gallons per minute. The pressure within the vessel 19 is maintained at 45 p.s.i.a. bottom, and the gas passing through the drip tank 39 and ejector 40 produces a pressure of 20 pounds per square inch absolute in the storage drum. A temperature of 270° F. and a pressure of 42 p.s.i.a. is maintained in the drip tank 35 and a temperature of 120–130° F. and a pressure of 17 p.s.i.a. is maintained in the accumulator 49. Material from the drip tank flows into drum 28. The demineralized water is recovered from line 50. The purified monoethanolamine entering the drum 28 from vessel 19 contains less than .6 cu. ft. of $CO_2$ per gallon of amine and substantially no $H_2S$, thus illustrating the efficiency of regeneration with the process of the invention. For conventional regeneration, the amine will contain 1.5 cu. ft. of $CO_2$ per gallon.

Figure 4:
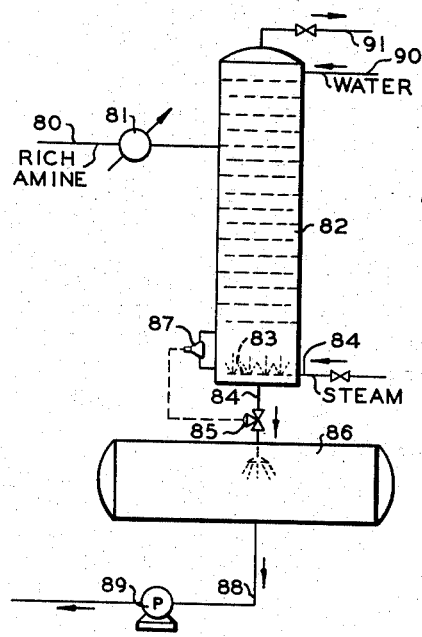
Figure 4 is a detailed view of a portion of the apparatus shown by Figure 3.

In Figures 3 and 4, I have shown a modification of the invention wherein the contacting between a monoethanolamine treating solution and steam takes place in a stripping column but the formation of corrosive decomposition products is avoided due to the practically instantaneous heating by the use of a live steam as the reactivation agent and the maintenance of temperatures below 290° F. in all parts of the liquid. In the system illustrated by these figures, the rich amine enters through a line 80 and passes through a heat exchanger 81 where its temperature is raised to a value within the range of 150 to 250° F. The heated material is introduced to an intermediate tray of a stripping column 82 while live steam is introduced through nozzles 83 at the bottom of the column by a valved line 84. Suitable conditions in the stripping column are a top temperature of 269° F., a bottom temperature of 274° F. and a bottom pressure of 45 p.s.i.a. gage. The steam efficiently removes the acidic compounds from the amine solution, and no undesirable decomposition products are formed due to the maintenance of a temperature within the range of 260 to 290° F.

The purified amine is withdrawn from the bottom of the column and passed through a line 84 under the control of a motor valve 85 to a storage drum 86. The motor valve 85 is operatively connected to a liquid level controller 87 to control the rate of withdrawal of the amine solution so as to maintain a predetermined liquid level at the bottom of the stripper column. The purified monoethanolamine solution is withdrawn from the drum 86 by a line 88 having a pump 89 therein and returned to the gas purification step as required.

Condensate is added through a valved line 90 at the top of the column at a sufficient rate to prevent loss of amine with the effluent gas from the top of the column.

The effluent, which is a mixture of steam, hydrogen sulfide and other acidic compounds passes through a line 91 and an ejector 92 having a line 93 extending into the drum 86. In this manner, the energy of the material leaving the top of the column is utilized to maintain a desired reduced pressure in the storage drum 86.

The line 91 also includes a motor valve 95 which is operatively connected to a back pressure recorder controller 96 having a sensing element 97 in the line 91. The unit 96 accurately controls the back pressure on the stripper column 82.

From the motor valve 95 and ejector 92, the overhead from the stripper 82 passes through a cooler 99 and, thence, to a knock-out drum 100. In the drum 100, the acidic compounds are taken overhead through a line 101, the back pressure being maintained constant on the column by a back pressure regulator 102 operatively connected to a motor valve 103 in the line 101 and having a sensing element 104 in the line 101. The acidic materials are passed to a flare, or other disposal, as desired.

A demineralized water product collects at the bottom of the drum 100 and this water is withdrawn through a line 105 controlled by a motor valve 106 operatively connected to a liquid level controller 107 so that the water is discharged at such a rate to maintain a predetermined level in the drum 100.

The water leaving through line 105 is passed by a pump 108 and a line 109 to any suitable facility for utilizing the water, a portion of the water being returned through a line 110 to the fractionation column 100 under the control of a flow controller 111 operatively connected to a motor valve 112 in line 110 and having a sensing element 113 in the line 110. The column 100 is provided at its top with a mist extractor 115 to prevent carry over of liquid with the gaseous effluent containing acidic compounds.

In the embodiment of Figures 3 and 4, it will be noted that the acidic compounds are effectively stripped or removed from the rich amine solution by contact with steam in the stripper vessel 82. Moreover, by virtue of the fact that the contacting temperature is maintained within the range of 260 to 290° F., there is no decomposition of the amine solution with resulting formation of extremely corrosive decomposition products. Hence, the contacting method of Figures 3 and 4 is quite superior to ordinary fractionation of the rich amine solution to separate the acidic compounds therefrom. In such reactivations, if the temperature, even at localized regions, rises to 300° F. or higher, a portion of the amine decomposes as resulting formation of corrosive decomposition products and resulting damage to the equipment in which the process is carried out.

While the invention has been described in connection with present, preferred embodiments thereof, it is to be understood that this description is illustrative only and is not intended to limit the invention.

I claim:

1. The process of treating an alkaline absorber solution utilized to remove absorbable acidic compounds constituting impurities from a gas which comprises contacting said solution with steam at a temperature below the decomposition temperature of the absorber solution, recovering purified absorber solution from the contacting step, transferring the purified absorber solution into a storage zone, withdrawing a gaseous effluent containing steam and said compounds from the contacting step, passing said stream through a path of restricted cross section, and establishing communication between said storage zone and said path of restricted cross section, whereby passage of the effluent through said path of restricted cross section produces a reduced pressure in said storage zone.

2. The method of treating an alkaline absorber solution utilized for the removal of absorbable acidic compounds constituting impurities from a gas which comprises contacting said absorber solution at an elevated temperature below the decomposition temperature of the solution with steam, transferring purified absorber solution from said contacting zone to a storage zone under reduced pressure whereby water is removed from said absorber solution, passing a gaseous fraction from said contacting zone into an enlarged settling zone wherein a portion of the steam is condensed and residual quantities of absorber solution are collected, passing the condensate to said storage zone, cooling the uncondensed material, condensing the remainder of the steam, and recovering a demineralized water condensation product.

3. The method of treating an alkaline absorber solution utilized for the removal of absorbable acidic compounds constituting impurities from a gas which comprises contacting said absorber solution at an elevated temperature below the decomposition temperature of the solution with steam containing a small amount of said compounds, thereafter concurrently contacting the partially purified solution with pure steam to remove the remainder of said compounds, transferring purified absorber solution from said contacting zone to a storage zone under reduced pressure whereby water is removed from said absorber solution, passing a gaseous fraction from said contacting zone into an enlarged settling zone wherein a portion of the steam is condensed and residual quantities of absorber solution are collected, passing the condensate to said storage zone, cooling the uncondensed material, condensing the remainder of the steam, and recovering a demineralized water condensation product.

4. The process of purifying an aqueous solution of monoethanolamine utilized to strip sulfur compounds from natural gas which comprises heating said solution to a temperature within the range of 150–250° F. in an indirect heat exchange zone free from decomposition of said monoethanolamine and contacting said heated monoethanolamine solution containing sulfur compounds in a separate zone with steam at a temperature of 260 to 290° F.

5. The process of purifying an aqueous solution of monoethanolamine utilized to strip sulfur compounds from natural gas which comprises heating said solution to a temperature within the range of 150–250° F. in an indirect heat exchange zone free from decomposition of said monoethanolamine, contacting said heated monoethanolamine solution containing sulfur compounds with steam at a temperature of 260 to 290° F. in a fractionation zone separate from said indirect heat exchange zone, recovering purified monoethanolamine as a bottoms product, recovering an overhead product containing steam and sulfur compounds, and condensing said overhead product to separate water therefrom.

6. The method of purifying natural gas containing hydrogen sulfide which comprises contacting said natural gas with an aqueous solution of monoethanolamine, recovering natural gas free from hydrogen sulfide, withdrawing a rich monoethanolamine solution containing hydrogen sulfide from the contacting step, contacting said rich solution with steam at a temperature below 300° F., recovering purified absorber solution from the contacting step, transferring the purified absorber solution to a storage zone, withdrawing a gaseous effluent containing steam and hydrogen sulfide from the contacting step, passing said stream through a path of restricted cross section, and establishing communication between said storage zone and said path of restricted cross section, whereby passage of the effluent through said path of restricted cross section produces a reduced pressure in said storage zone.

7. The method of purifying natural gas containing hydrogen sulfide which comprises contacting said natural gas with an aqueous solution of monoethanolamine, recovering natural gas free from hydrogen sulfide, withdrawing a rich monoethanolamine solution containing hydrogen sulfide from the contacting step, contacting said rich absorber solution at an elevated temperature below the decomposition temperature of the solution with steam, transferring purified absorber solution from said contacting zone to a storage zone, passing a gaseous fraction from said contacting zone into an enlarged settling zone wherein a portion of the steam is condensed and residual quantities of monoethanolamine are collected, passing the condensate to said storage zone, cooling the uncondensed material, condensing the remainder of the steam, and recovering a demineralized water condensation product.

8. The method of purifying natural gas containing hydrogen sufide which comprises contacting said natural gas with an aqueous solution of monoethanolamine, recovering natural gas free from hydrogen sulfide, withdrawing a rich monoethanolamine solution containing hydrogen sulfide from the contacting step, contacting said rich absorber solution at an elevated temperature below the decomposition temperature of the solution with steam, transferring purified absorber solution from said contacting zone to a storage zone, passing a gaseous fraction from said contacting zone into an enlarged settling zone wherein a portion of the steam is condensed together with residual quantities of monoethanolamine, passing the condensate to said storage zone, cooling the uncondensed material, condensing the remainder of the steam, recovering a demineralized water condensation product in an accumulator zone, passing steam in indirect heat exchange with said rich absorber solution to provide said elevated temperature, and establishing communication between the heat exchange zone thus defined and the accumulator zone wherein said portion of the steam is condensed, there being an enlarged steam trap zone in the path of communication.

References Cited in the file of this patent

UNITED STATES PATENTS

| | | |
|---|---|---|
| 2,242,323 | Powell | May 20, 1941 |
| 2,318,522 | Powell | May 4, 1943 |
| 2,477,314 | Scharmann | July 26, 1949 |
| 2,615,786 | Proell et al. | Oct. 28, 1952 |
| 2,615,787 | Randlett | Oct. 28, 1952 |